(12) United States Patent
Staudenmaier et al.

(10) Patent No.: US 10,109,260 B2
(45) Date of Patent: Oct. 23, 2018

(54) DISPLAY PROCESSOR AND METHOD FOR DISPLAY PROCESSING

(71) Applicants: Michael Staudenmaier, Munich (DE); Vincent Aubineau, Gif sur Yvette (FR); Anton Rozen, Gedera (IL)

(72) Inventors: Michael Staudenmaier, Munich (DE); Vincent Aubineau, Gif sur Yvette (FR); Anton Rozen, Gedera (IL)

(73) Assignee: NXP USA, INC., Austin, TX (US)

( * ) Notice: Subject to any disclaimer, the term of this patent is extended or adjusted under 35 U.S.C. 154(b) by 183 days.

(21) Appl. No.: 14/766,986

(22) PCT Filed: Feb. 12, 2013

(86) PCT No.: PCT/IB2013/000431
§ 371 (c)(1),
(2) Date: Aug. 11, 2015

(87) PCT Pub. No.: WO2014/125319
PCT Pub. Date: Aug. 21, 2014

(65) Prior Publication Data
US 2015/0379971 A1    Dec. 31, 2015

(51) Int. Cl.
G09G 5/397   (2006.01)
G09G 5/14    (2006.01)
G06T 11/60   (2006.01)

(52) U.S. Cl.
CPC .............. *G09G 5/397* (2013.01); *G06T 11/60* (2013.01); *G09G 5/14* (2013.01); *G09G 2340/12* (2013.01)

(58) Field of Classification Search
CPC ...... G09G 5/397; G09G 5/14; G09G 2340/12; G09G 2340/10; G09G 2340/125; G06T 11/60; G06T 15/503
See application file for complete search history.

(56) References Cited

U.S. PATENT DOCUMENTS

| 4,742,474 A | 5/1988 | Knierim |
| 4,940,971 A | 7/1990 | Hasebe |
| 5,185,859 A | 2/1993 | Guttag et al. |
| 5,469,541 A | 11/1995 | Kingman et al. |
| 6,111,605 A * | 8/2000 | Suzuki ............... H04N 1/00129 348/220.1 |

(Continued)

OTHER PUBLICATIONS

International Search Report and Written Opinion correlating to PCT/IB2013/000431 dated Jul. 22, 2013.

(Continued)

*Primary Examiner* — Abderrahim Merouan

(57) ABSTRACT

A display processor device is for processing display image data by overlaying a multitude of image layers. Pixel values of at least one of the image layers are stored in a memory and may comprise pixels values having a single predefined value, such as transparency. The display processor has a fetch unit for selectively fetching stored pixel values from the memory by skipping stored pixels values having the single predefined value according to a fetch mask indicative of pixels values having the single predetermined value. Advantageously the bandwidth for accessing the memory is reduced, because less pixel data values need be retrieved. Power consumption may be reduced, and slower memories may be applied.

19 Claims, 4 Drawing Sheets

(56) References Cited

U.S. PATENT DOCUMENTS

| | | | | |
|---|---|---|---|---|
| 6,518,974 | B2* | 2/2003 | Taylor | G09G 5/02 345/582 |
| 7,400,328 | B1* | 7/2008 | Ye | G09G 5/14 345/531 |
| 8,503,036 | B2* | 8/2013 | Cassidy | G06K 9/40 345/612 |
| 2008/0204470 | A1 | 8/2008 | Kato | |
| 2012/0120320 | A1 | 5/2012 | Chowdhry et al. | |
| 2013/0010088 | A1 | 1/2013 | Park | |
| 2013/0336582 | A1* | 12/2013 | Dai | G06K 9/4652 382/165 |

OTHER PUBLICATIONS

Fujitsu Semiconductor America, Inc., Product Brief, "Fujitsu Graphics Display Controllers," 4 pages; copyright 2011; downloaded on Apr. 4, 2017 from <<www.fujitsu.com/downloads/MICRO/fma/pdf/GDC_Overview.pdf>>.

* cited by examiner

DISPLAY PROCESSOR AND METHOD FOR DISPLAY PROCESSING

FIELD OF THE INVENTION

This invention relates to a display processor device and a method for processing display image data by overlaying a multitude of image layers.

BACKGROUND OF THE INVENTION

U.S. Pat. No. 5,469,541 describes an example of overlaying by window specific control of overlay planes in a graphics display system. By a graphics environment window the characteristics of an overlay common to multiple-windows are controlled while operating within the context of a conventional RAMDAC overlay control architecture. Window specific overlay control is accomplished by concatenating the window, masking and overlay data as an address to a mapping memory. The bit content of the mapping memory is controlled directly by the general purpose processor to selectively refine the relationship between the concatenated input as an address and the mapping memory output as the state conveyed to the overlay control of the RAMDAC. A common overlay is thus selectively modifiable by window Overlaying planes or windows requires respective image data to be fetched from memory. The known system requires many memory fetches to retrieve the pixel values for the layers to be overlayed.

SUMMARY OF THE INVENTION

The present invention provides a display processor device, and a method, as described in the accompanying claims.

Specific embodiments of the invention are set forth in the dependent claims. Aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Examples of the present invention will now be described with reference to an example of display processor for display image data. It is noted that such a processor may be part of a larger graphical processing unit (GPU) or dedicated display controller, or any other image processing system, such as a sprite based display processor. So it will be appreciated that the present invention is not limited to the specific processing architecture herein described with reference to the accompanying drawings, and may equally be applied to alternative architectures.

In computer graphics, when a given image is intended to be placed over a background, the transparent pixels can be identified by a specific pixel value, or an additional value may be stored per pixel indicative of the transparency. Also, transparent areas can be specified through a binary mask. This way, for each intended image there may actually be two bitmaps: the actual image, in which the unused areas are given a pixel value with all bits set to a specific value, e.g. 0's, and an additional mask, in which the correspondent image areas are given a pixel value indicative of the transparency or the non-transparency, e.g. transparent pixel mask bits set to 0 s and the surrounding areas a value of all bits set to 1 s.

At run time, to put the image on a layer over a background layer, an overlaying unit may operate as follows. First the layer's pixels are masked with the image mask at the desired coordinates, e.g. using a bitwise AND operation. This preserves the background pixels of the transparent areas while resets with zeros the bits of the pixels which will be obscured by the overlapped image.

Then, the overlaying unit renders the image pixel's bits by blending them with the background pixel's bits using the bitwise OR operation. This way, the image pixels are appropriately placed while keeping the background surrounding pixels preserved. The result is a perfect compound of the image over the background.

The above overlaying technique may be used for painting pointing device cursors, in typical 2-D videogames for characters, bullets and so on (so called sprites), for graphical user interface (GUI) icons, and for video titling and other image mixing applications.

The system proposed below reduces memory bandwidth consumed by any sprite based display system. For example, for embedded systems capturing display graphic directly out of a Flash memory device connected externally, it is relevant to keep the bandwidth as low as possible.

Figure 1:
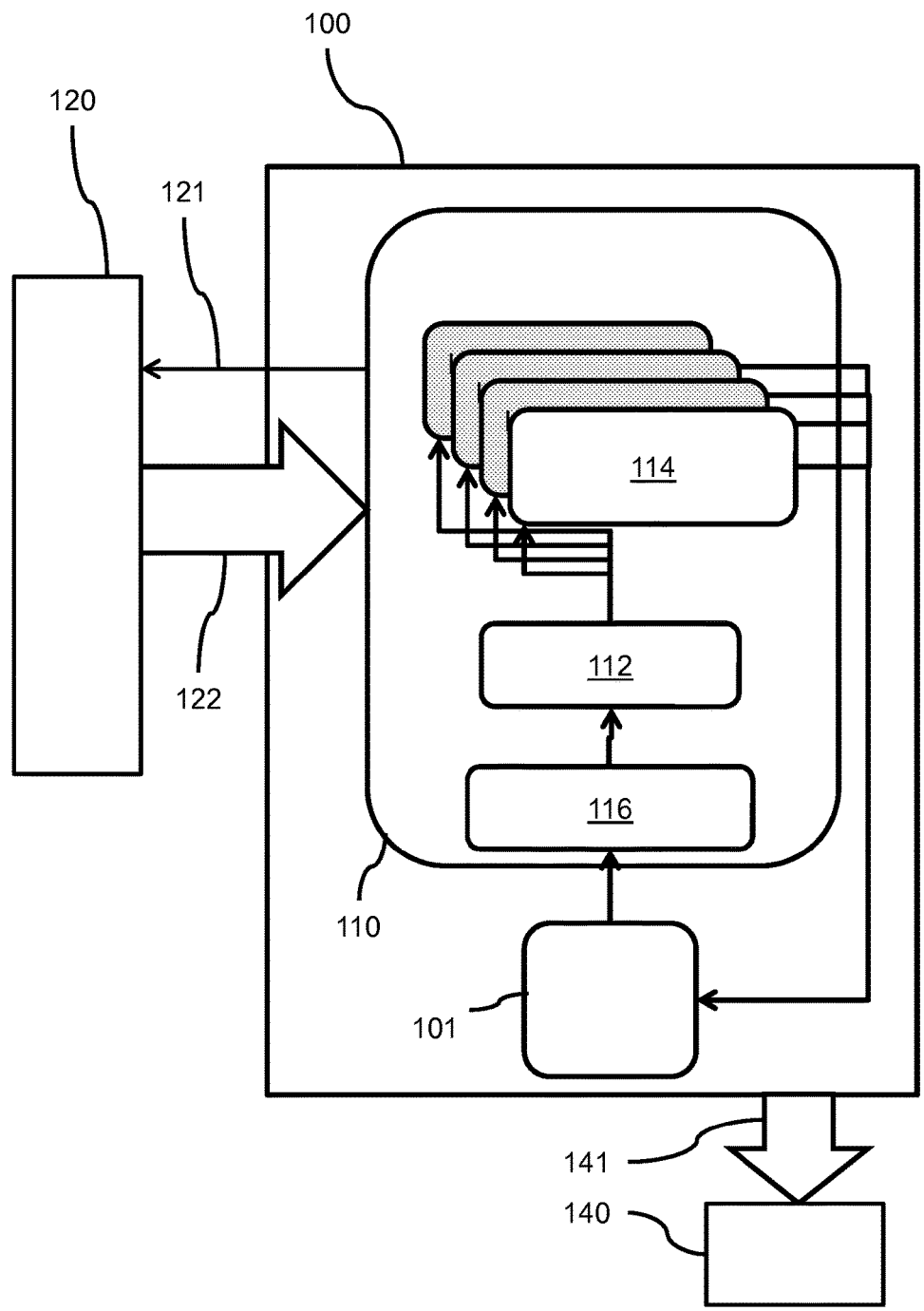
FIG. 1 shows an example of a display processor having a fetching unit.

FIG. 1 shows an example of a display processor having a fetching unit. A display processor 100 is coupled to a display device 140, for example a monitor or a dedicated car display, also called a cluster display. The display processor is coupled to a memory 120 for retrieving image data 122 based on address and control signals 121. The display processor has a fetch unit 110 for selectively fetching stored pixel values from the memory 120. The display processor is arranged for processing one or more layers of image data by overlaying into an output image to be transferred to the display device via display signal 141.

The fetch unit 110 is arranged for fetching one or more image layers to be overlayed, shown as a multitude of image layers 114. Pixel values of the respective layers may be stored in local memory, e.g. so called layer buffers, may be generated locally or may be retrieved from the external memory 120. An example of a case where the graphic data is stored locally in the display controller is a cursor. Another example is a background color, i.e. the entire plane has a constant color. Usually the image data is fetched from an external source. To be less sensitive to latencies introduced by external memories there may be pre-fetch FIFOs which store next pixel data required for each plane.

Layers of image data may have substantial areas of pixels values having a single predefined value, e.g. a background color around an object, or a transparent area. Transparent means that the display output signal in such areas is formed during overlaying by the pixel values of lower layers, whereas non transparent pixels are used from the current layer, i.e. assuming that the current layer is in front.

The fetching unit is provided with a fetch control unit 112 for selectively fetching stored pixel values from the memory by skipping stored pixels values having the single predefined value according to a fetch mask from a mask unit 101.

In the fetch mask a mask value, e.g. a bit, corresponds to a pixel on the corresponding location in the image layer, and indicates whether such pixel has a pixel value to be fetched, or that fetching may be skipped because the respective pixel has said predefined pixel value. Hence the mask values are indicative of pixels values having the single predetermined value. If so indicated, the predefined value may be entered in the respective layer buffer for the location of the corresponding pixel internally in the display processor. Alternatively the overlaying function may be controlled according to the mask values, e.g. by skipping the overlaying for pixels that are indicated to be transparent in the layer that is to be overlayed. The fetch mask obviates the need for a memory access cycle to the external memory for pixels that are indicated to have said predefined value.

A respective fetch mask may be provided for each respective layer, or for some layers only, e.g. for layers that are to be fetched from external memory, in particular if such memory is relatively slow. When pixel values of a respective layer have to be fetched the corresponding fetch mask may be activated and retrieved from the mask unit as indicated by respective arrows in the Figure.

In the display processor, the mask is provided in a memory that contains masking data indicating which pixels of a specific layer are not used. Storing the mask requires a rather limited amount of memory and such memory could be placed on a chip also having the display processor. The mask may contain strings of bits having the same value, and therefore is suitable for run length encoding (RLE compression) using a compressed storage format. Then decompression is required doing decoding of mask data.

Optionally, the fetch mask may be stored in a compressed form in the mask unit 101. The display processor may be provided with a decompressor 116 for decompressing a fetch mask. If so, after retrieving the fetch mask, the decompressor 116 is activated for regenerating the original fetch mask.

Figure 2:
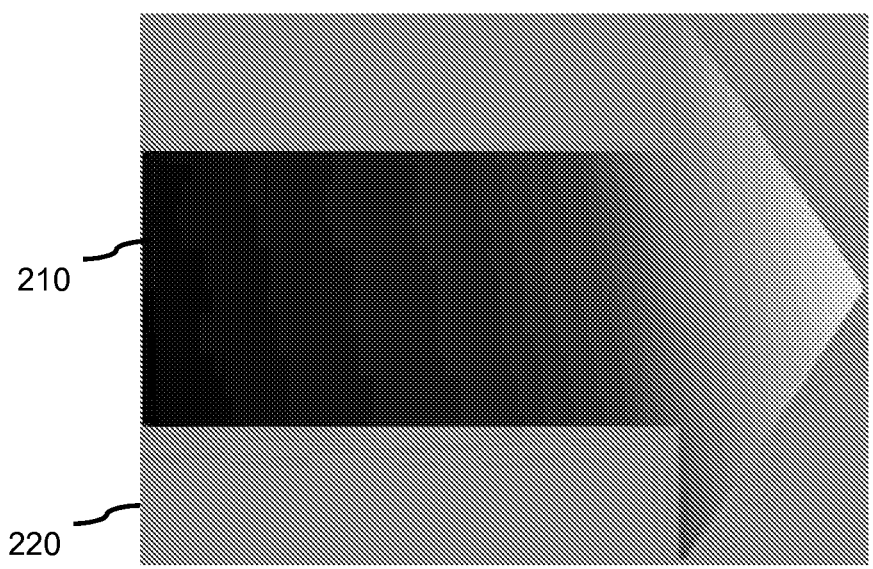
FIG. 2 shows an example of an image layer of a graphical element and transparent areas to be masked.

FIG. 2 shows an example of an image layer of a graphical element and transparent areas to be masked. An image layer 200 is shown to have an active image area 210 representing the graphical element, i.e. an arrow. Around the arrow is a background area 220, which may be transparent or has a single background color, i.e. having a single predetermined pixel value. A corresponding fetch mask has mask values in said background area 220 that indicate that stored pixels corresponding to the mask values need not be fetched. In the example, roughly 50% of the image is populated, and the remaining part is transparent (here shown as gray). So effectively the memory accesses require 50% less bandwidth.

It is noted that the example shows an image layer where the active image area touches all boundaries. Other examples may have an active image area surrounded by transparent background. The corresponding mask data then indicates that such areas contain only background.

Figure 3:
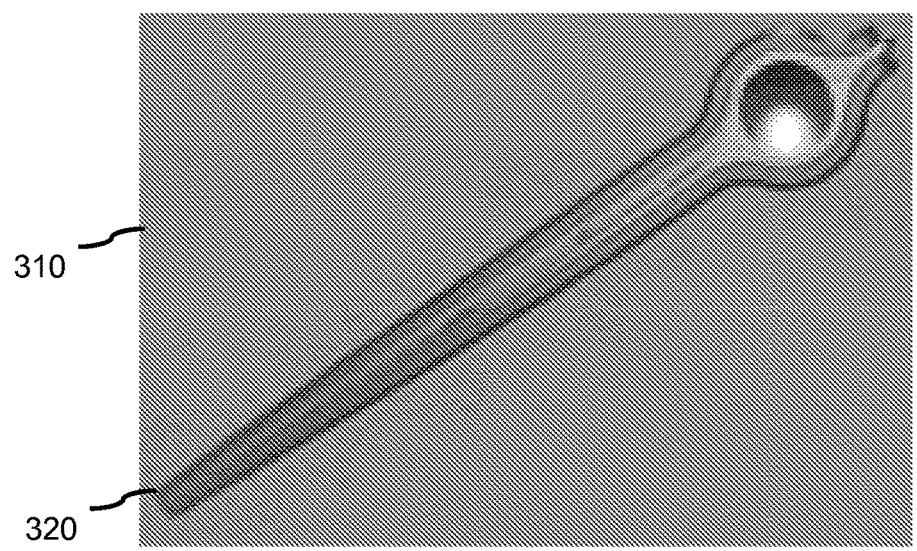
FIG. 3 shows an example of an image layer of an arbitrary shaped object and transparent areas to be masked.

FIG. 3 shows an example of an image layer of an arbitrary shaped object and transparent areas to be masked. An image layer 300 is shown to have an active image area 320 constituting the object, i.e. a dial indicator. Around the object is a background area 310, which may be transparent or has a single background color, i.e. having a single predetermined pixel value. A corresponding fetch mask has mask values in said background area 310 that indicate that stored pixels corresponding to the mask values need not be fetched. In the example, the needle roughly has 20% of the image layer populated, so a reduction of 80% of memory bandwidth is achieved. In general, whenever an image element is not rectangular, memory bandwidth is saved by the above processor applying the fetch mask.

Optionally, the fetch mask is a bit mask having bit values, each bit value indicating whether a corresponding pixel has the single predefined value. In the examples of FIGS. 2 and 3 the grey background area may be masked by such bit vales indicating that the pixels on locations corresponding to the respective bit values, have the transparency property.

Optionally, the fetch mask is a bit mask having bit values, each bit value indicating whether a corresponding set of pixels have the single predefined value. The set of pixels may, for example, be 4, 8 or 16 pixels all having said single predefined value. Hence the resolution of the fetch mask is lower than the resolution of the image data of the layer. Nevertheless a substantial reduction of memory access cycles is achieved when the image has large areas having said predefined value. The size of the fetch mask is reduced by a factor corresponding to the set size. In a further embodiment, the set size, or memory data amount of the pixel values of the set of pixels, is designed to correspond to a retrieval unit having multiple bytes retrievable from the memory by a single memory access operation. Memory systems often have a memory access mode in which a number of bytes are retrieved by a single memory access cycle, e.g. 16 consecutively stored bytes. The mask resolution can be set to match the resolution of retrieving pixel data bytes in the memory.

Optionally, in the device as described above, each layer of the multitude of image layers has a corresponding fetch mask. The device may have a set of registers of mask buffers to store the number of masks corresponding to the multitude of layers to be overlaid. The overlaying, and required fetching, is not interrupted by (re-)loading masks.

Optionally, in the device as described above, the fetch unit is arranged for retrieving the fetch mask from the memory, e.g. an external memory such as flash memory, static memory or DRAM, or (less common) a remote graphics memory e.g. connected via an USB interface. In practice, such external memories may be relatively slow, so selectively fetching only data bytes that are necessary according to the fetch mask enables the use of slower external memories, and/or may reduce bandwidth so reduce power consumption and possibly noise.

Optionally, in the device as described above, the fetch unit is arranged for generating the fetch mask for an image layer based on fetching said layer initially in full from the memory. The fetch unit may detect said predefined value when reading the mask in full in an initial or preparatory cycle. Such a cycle may be slower, but when the fetch mask has been generated, subsequent operational cycles are faster. Alternatively, the mask may be generated in the first pass while the output frequency of the display controller is defined by the display, so having the nominal rate. Now the first pass generates a higher memory bandwidth while subsequent accesses benefit from the bandwidth reduction.

Also, the mask may be generated on the fly. The image may be rendered by a GPU, which subsequently generates a mask for the rendered image. The mask may also be constructed by searching for transparent or black pixels with a CPU or a dedicated hardware circuit.

Optionally, in the device as described above, the fetch unit is arranged for preloading the fetch mask for an image layer before fetching said layer from the memory. The fetch mask may be stored with the respective image data in the memory, or in a different memory. The fetch unit may be programmed or instructed to retrieve the respective fetch mask or masks before the overlaying is performed.

Optionally, in the device as described above, the fetch mask is available in a compressed form and the fetch unit is arranged for decompressing the fetch mask. Such compressed fetch masks require less storage space.

Optionally, in the device as described above, the single predefined value is indicative of a transparency of the pixel in the overlaying. Alternatively, the single predefined value is indicative of a single color of the pixel. The predefined value may also be determined on the fly, e.g. by analyzing the image data and detecting if substantial areas have a single color. Also, the predefined value may be set according to the first pixel of the respective layer, or the last pixel value actually retrieved. Hence the color of the last populated pixel is repeated until the mask indicates that a new pixel value must be fetched.

Optionally, the masking may be applied to a scaled layer. As such, scaling is a well known function, and may be implemented in the hardware of the display controller. The mask is scaled corresponding to the data of the image. The pixel data to be retrieved may be further reduced due to downscaling before actually retrieving the pixel data from memory.

Furthermore, the fetch mask system may be applied to any element on an image plane that has surrounding transparent pixels. For example, a large picture (800*600 pixels in size) uses only a small piece (e.g. 400*300) for active image data, and everything else is transparent. Basically one can save at least % of the memory bandwidth using the fetch mask. Hence the fetch mask may be used both for rectangular areas, windows, and, in particular, for any non-rectangular shape surrounded by transparent or single color background.

In a practical application, e.g. for a car display system, an integrated circuit may contain the above described electronic device, or a multitude of such image display processors for multiple displays.

Figure 4:
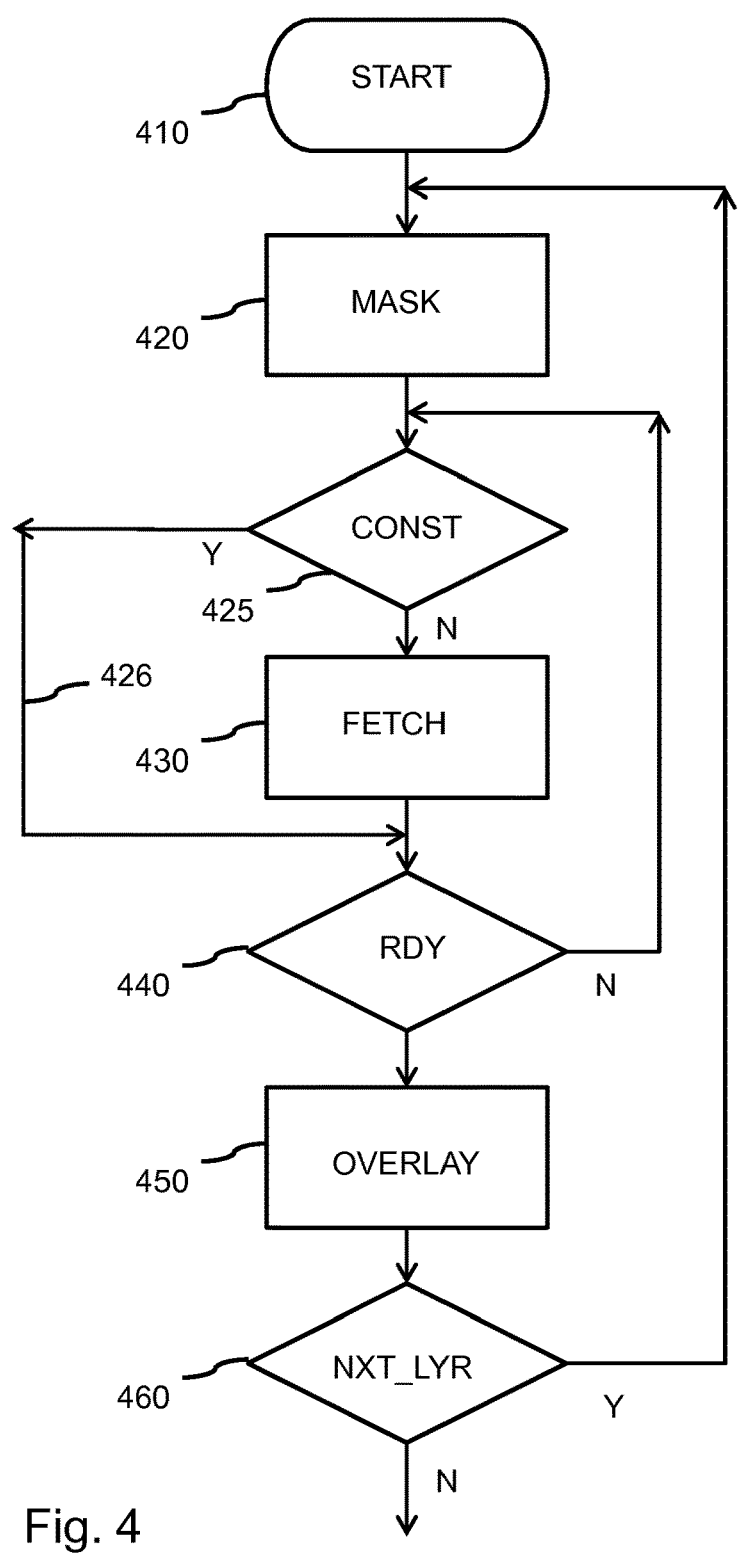
FIG. 4 shows an example of a method of processing display image data.

FIG. 4 shows an example of a method of processing display image data. The method generates display image data by overlaying a multitude of image layers. The method starts at node START 410. At least one of the image layers is available from a memory where the pixel values are stored. Said layer has pixels values having a single predefined value, e.g. indicating that the pixel is transparent. In a step MASK 420 a fetch mask for the respective layer is retrieved, e.g. from a memory. The fetch mask indicates whether pixels values have the single predetermined value. Optionally, the mask is stored in a compressed form and is decompressed.

In a next step CONST 425 the method determines whether to selectively fetch stored pixel values from the memory by skipping stored pixels values having the single predefined value according to the fetch mask. If the mask indicates a constant value, the corresponding pixel or set of pixels is skipped as indicated by arrow 426. If the mask value indicate a pixel value to be fetched, in the step FETCH 430 the memory is accessed to fetch the image values of the corresponding pixel or set of pixels. The fetching continues until, in test RDY 440, all non transparent pixel values of the layer have been read from the memory to a layer buffer. Buffer locations that are not filled by actual pixel values are, for example, set to zero, or to a predefined other value.

Alternatively, the fetch mask may be used again during the next step OVERLAY 450 to skip any pixels that are indicated to be transparent in the current layer being overlaid.

Finally, in a test 46 NXT_LYR, it is determined whether all layers are overlaid as required. If not, the next layer and next fetch mask are retrieved, restarting the process at step MASK 420. If overlaying is ready, the output display signal is made available for the display (not shown), until a next image needs to be generated, and the method is reiterated at START 410.

It is noted that fetching a full layer, and applying the mask per layer, could used when performing the processing in a GPU having sufficient internal memory. Alternatively, the processing for multiple layers may actually run in parallel, e.g. in a display controller. The output of a display controller now is, for example, a fully blended result pixel per clock cycle. Expressing such parallel processing in a pseudo-code would be:

For each destination pixel do:
  For each plane:
    Blend plane over background;
  Output(pixel)

Such process could be illustrated by repeatedly, for each pixel, applying the diagram of FIG. 4, i.e. for each pixel location accessing the respective masks for all planes and fetching or skipping the corresponding layer pixel values.

Optionally, in the method, the fetch mask is a bit mask having bit values, each bit value indicating whether a corresponding pixel has the single predefined value. Such a bit mask provides the masking data in an efficient form.

Optionally, the mask value is indicative of whether the respective pixel is transparent or opaque. In the event that a pixel is opaque any pixel values of lower layers need not be fetched, i.e. more backward laying pixel values need not be retrieved at all, because such backward laying pixels would be superseded by the overlaying. Now, the combined set of masks may also be used to directly determine from which layer a pixel value must be retrieved to provide the final pixel value for a particular location. By starting at the front, skipping all layers that are transparent on that pixel location, the foremost, opaque pixel is determined. So, by first logically combining the corresponding mask values of all layers for a particular pixel location, only said foremost pixel value needs to be retrieved. The required bandwidth is now effectively reduced to retrieving only one pixel value from memory for each pixel location. In fact, the overlaying process is replaced by directly reading the foremost, opaque pixel value from external memory.

Optionally, in the method, each layer of the multitude of image layers has a corresponding fetch mask. In such setup the system is less complex in that for each layer the same process of fetching is used. Alternatively, only a subset of the multitude of image layers has a corresponding fetch mask It is noted that some layer may contain hardly any or no pixels that may be skipped. For such layers, no mask needs to be provided, or a control header in the mask of that layer may indicate that no pixels values are masked transparent at all.

Optionally, in the method, the fetch mask for an image layer is generated based on processing said layer in full. So, during an initial processing step, the respective layer is retrieved from the memory in full. The method then determines which pixels do have said single predefined value, e.g. indicating transparency. Subsequently, the fetch mask is generated corresponding to the actual contents of the layer. The mask may be used for subsequent occurrences of overlaying the respective layer. Thereto, the fetch mask may be stored in an internal mask memory in a display processor or processing system, or in the external memory with the original full layer data. An identification of the respective layer, e.g. the starting address in the memory, may be stored with the fetch mask.

Optionally, in the method, said generating the fetch mask is performed off-line before operationally generating the display image data. The fetch mask may be generated before the actual overlaying process is used, e.g. during manufacture or design of the display processing system, so called off line preparation.

Optionally, in the method, the fetch mask for an image layer is preloaded before fetching said layer from the memory. So each time a new overlaying process is started, the respective layer is identified and the corresponding fetch mask is retrieved.

Optionally, in the method, the fetch mask is available in a compressed form and the method comprises decompressing the fetch mask.

In a practical system, the method may be implemented in a processor system, or in a software program for a display processor. Such a computer program product has the instructions for causing a processor system to perform a method of generating display image data as described above.

In summary, the enhancement resides in providing a fetch mask for a display processor device for overlaying a multitude of image layers. Pixel values of at least one of the image layers are stored in a memory and may comprise pixels values having a single predefined value, such as transparency. The fetch mask enables reducing the amount of memory reads when fetching a layer to be overlayed based on it being partially transparent. The display processor has a fetch unit for selectively fetching stored pixel values from the memory by skipping stored pixels values having the single predefined value according to a fetch mask indicative of pixels values having the single predetermined value. Advantageously the bandwidth for accessing the memory is reduced, because less pixel data values need be retrieved. Power consumption may be reduced, and slower memories may be applied.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be a type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Furthermore, the units and circuits may be suitably combined in one or more semiconductor devices.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A display processor device for processing display image data by overlaying a multitude of image layers to display images on a display with a display area of the entire display, the display processor comprising:
   a memory configured to store pixel values of at least one of the image layers, wherein the display image data comprises one or more pixel values of a single predefined value;
   a fetch unit, coupled to the memory, and configured to selectively fetch stored pixel values from the memory by skipping stored pixels values having the single predefined value according to a fetch mask, wherein the fetch mask spans the display area and corresponds to pixels values having the single predetermined value.

2. The display processor device as claimed in claim 1, wherein the fetch mask is a bit mask having bit values, each bit value indicating whether a corresponding pixel has the single predefined value.

3. The display processor device as claimed in claim 1, wherein the fetch mask is a bit mask having bit values, each bit value indicating whether a corresponding set of pixels have the single predefined value.

4. The display processor device as claimed in claim 3, wherein the memory data amount of the pixel values of the set of pixels corresponds to a retrieval unit having multiple bytes retrievable from the memory by a single memory access operation.

5. The display processor device as claimed in claim 1, wherein each layer of the multitude of image layers has a corresponding fetch mask.

6. The display processor device as claimed in claim 1, wherein the fetch unit is arranged for retrieving the fetch mask from the memory.

7. The display processor device as claimed in claim 1, wherein the fetch unit is arranged for generating the fetch mask for an image layer based on fetching said layer initially in full from the memory.

8. The display processor device as claimed in claim 1, wherein the fetch unit is arranged for preloading the fetch mask for an image layer before fetching said layer from the memory.

9. The display processor device as claimed in claim 1, wherein the fetch mask is available in a compressed form and the fetch unit is arranged for decompressing the fetch mask.

10. The display processor device as claimed in claim 1, wherein the single predefined value is indicative of a transparency of the pixel in the overlaying.

11. The display processor device as claimed in claim 1, wherein the single predefined value is indicative of a single color of the pixel.

12. The method of generating display image data as claimed in claim 1, comprising generating the fetch mask for an image layer based on processing said layer in full.

13. The method of generating display image data as claimed in claim 12, wherein said generating the fetch mask is performed off-line before operationally generating the display image data.

14. The method of generating display image data as claimed in claim 12, wherein the method comprises compressing the fetch mask.

15. An integrated circuit comprising at least one electronic device according to claim 1.

16. A method of generating display image data displayed on a display with a display area of the entire display, the method comprising:
   storing pixel values of at least one image layer of a plurality of image layers of the display image data;
   selectively fetching stored pixel values from the memory by skipping stored pixels values having a single predefined value according to a fetch mask indicative of pixels values having the single predetermined value, wherein the fetch mask spans the display area.

17. The method of generating display image data as claimed in claim 16, wherein the fetch mask is a bit mask having bit values, each bit value indicating whether a corresponding pixel has the single predefined value.

18. The method of generating display image data as claimed in claim 16, wherein each layer of the multitude of image layers has a corresponding fetch mask, or only a subset of the multitude of image layers has a corresponding fetch mask.

19. The method of generating display image data as claimed in claim 16, comprising preloading the fetch mask for an image layer before fetching said layer from the memory.

* * * * *